United States Patent [19]

Kruse et al.

[11] Patent Number: 4,617,122

[45] Date of Patent: Oct. 14, 1986

[54] CRIMP SEAL PLEATED FILTER ASSEMBLY

[75] Inventors: Barbara L. Kruse, Minneapolis; Darrell D. Gronli, St. Louis Park; Donald D. Gronholz, Bloomington, all of Minn.

[73] Assignee: Donaldson Company, Inc., Minneapolis, Minn.

[21] Appl. No.: 636,578

[22] Filed: Aug. 1, 1984

[51] Int. Cl.⁴ ............................................. B01D 46/52
[52] U.S. Cl. .................................... 210/493.3; 55/521
[58] Field of Search ......................... 55/497, 499, 521; 210/493.3, 493.1

[56] References Cited

U.S. PATENT DOCUMENTS

| | | | |
|---|---|---|---|
| 1,104,159 | 7/1914 | Witter | 313/118 |
| 1,171,952 | 2/1916 | Higgin | 156/14 |
| 1,987,860 | 1/1935 | Milone | 156/14 |
| 2,058,669 | 10/1936 | Dollinger | 55/499 |
| 2,130,107 | 9/1938 | Somers | 183/71 |
| 2,135,863 | 11/1938 | Walker | 55/494 |
| 2,709,489 | 5/1955 | Keebler | 160/381 |
| 3,142,550 | 7/1964 | Kuehne | 55/495 |
| 3,695,012 | 10/1972 | Rolland | 55/521 X |
| 3,712,033 | 1/1973 | Gronholz | 55/521 X |
| 3,793,813 | 2/1974 | McAllister | 55/521 X |
| 3,869,392 | 3/1975 | Wolf | 55/521 X |
| 3,873,288 | 3/1975 | Wachter et al. | 55/521 X |
| 4,133,661 | 1/1979 | Strnad | 55/521 X |
| 4,165,287 | 8/1979 | Goyne | 210/493.1 X |
| 4,187,182 | 2/1980 | Rosenberg | 210/493.3 X |
| 4,386,948 | 6/1983 | Choksi et al. | 210/493.3 X |

Primary Examiner—Frank Spear
Attorney, Agent, or Firm—Merchant, Gould, Smith, Edell, Welter & Schmidt

[57] ABSTRACT

A crimp seal pleated filter assembly having a base (20), a frame (40) and a filter media (60), including a plurality of pleats (66). When assembled, the pleats (66) of the filter media (60) are uniformly aligned within the assembly 10 and are secured therein by crimp sealing the filter media ends (62) between interlocking projections (30) 50 on the sides (23) of the base (20) and side walls 43 of the frame. Outboard end flaps (68) of the filter are crimp sealed and encapsulated between side blades (26) of the frame (20) and the front wall (42) and back wall (44) of the frame, minimizing flaking or chafing of fibers from the filter (60).

7 Claims, 8 Drawing Figures

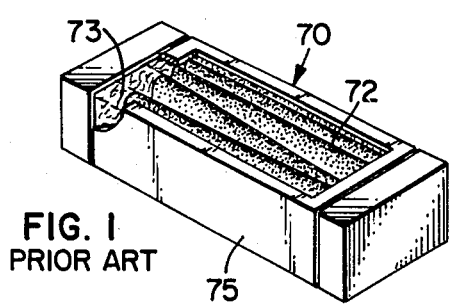
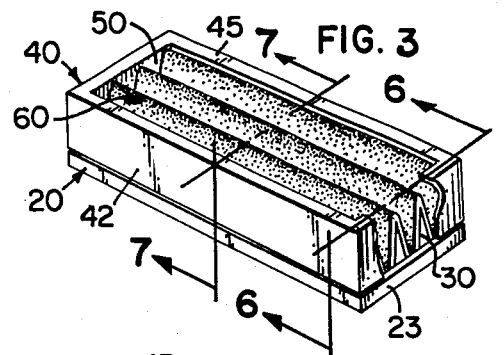
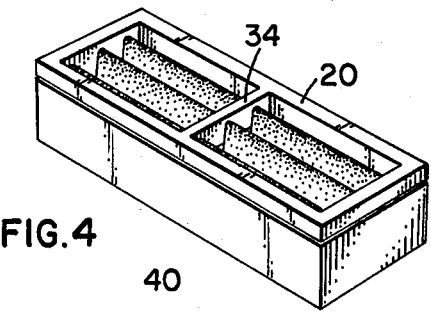
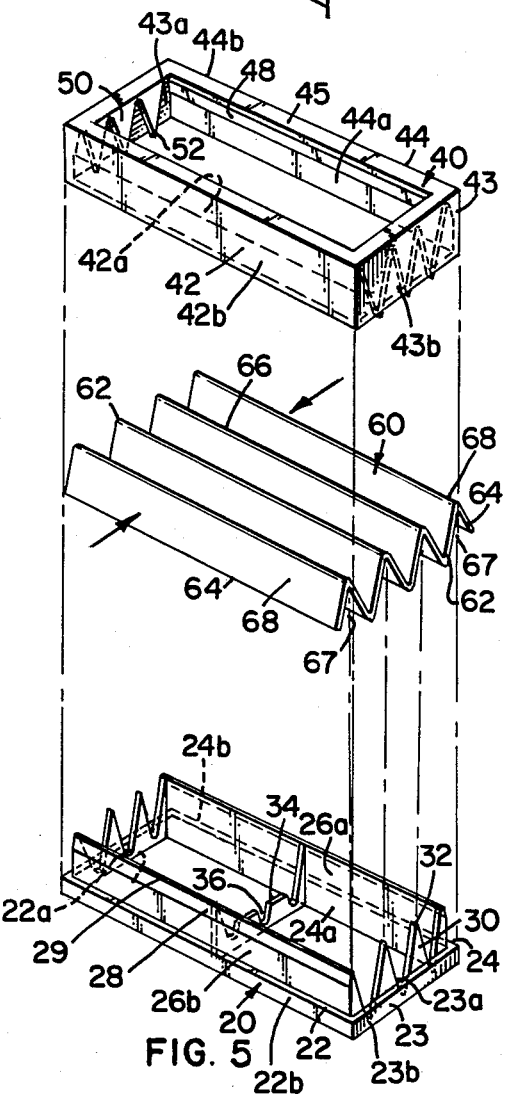
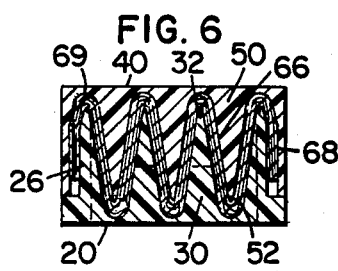
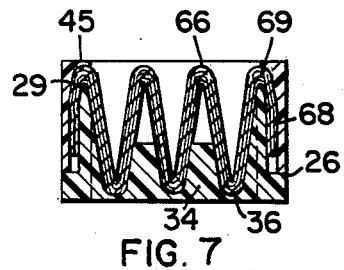

CRIMP SEAL PLEATED FILTER ASSEMBLY

TECHNICAL FIELD

The present invention relates to a crimp seal pleated filter media assembly included primarily for use in confined spaces requiring high levels of filtration, such as Winchester disk drives. More particularly, the invention relates to a filter assembly having a base and a corresponding frame member. The base and frame member interlockingly cooperate to encapsulate and seal a pleated filter media at all peripheral edges.

BACKGROUND OF THE INVENTION

The present invention is intended for use in environments where extremely high degree of filtration is required in a relatively small space. These two requirements tend to conflict and therefore special techniques are required to produce the desired result.

In the computer field for example, there is a need to provide filtration within the sealed enclosures of hard or "Winchester" disk drives. Hard disk drives have an inflexible platter coated with magnetic material which is spun very rapidly. A magnetic read/write head "flies" only a few microns above the disk on an air cushion. If particulate matter were to become lodged between the disk and the head, the disk drive would be destroyed. On the other hand, there is no space for large and sophisticated filtration equipment within the drive since it is a requirement to make the drives as small as possible.

An attempt is made to seal the drive units in a clean environment however particulate matter will always exist or be created by matter breaking away from mechanical structures within the drive and therefore filtration is essential. Ordinary filtration however would create more of a problem than a solution since the filter media itself, at it peripheral edges, is a huge source of particulate matter. The fibers in the media itself are much too large to be allowed to float freely within the enclosure. Therefore, it is essential that the filter not only be capable of trapping existing particulate matter but not contribute to that problem by flaking fibers from its edges.

In the prior art, adhesives have been used to seal the peripheral edges of filter media. This is counter-productive however since the filter assemblies are so small that adhesive seriously reduces the loading capacity of the filter. Remembering that the drive units are sealed for life, there is no opportunity to replace the filter when it is fully loaded.

A second problem existing in prior art devices is the loss of filter capacity resulting from the inability to maintain spacing between the pleats. Existing filter assemblies do not accommodate the accordion type folds of the filter in a manner that maintains uniform distance between adjacent pleats resulting in distortion and significant filter capacity being lost.

The present invention overcomes these problems of fiber flaking and improper pleat spacing while maintaining and maximizing the amount of loading capacity of the filter. Furthermore, this goal is accomplished by a simple and inexpensive assembly structure.

SUMMARY OF THE INVENTION

The present invention relates to a crimp seal pleated filter media assembly for small disk drives including a base having a peripherally four-sided shape, a frame having a peripherally four-sided shape and a filter media. The base and frame each have a plurality of projections which interlockingly cooperate to crimp seal the pleated filter assembly.

End pleats are encapsulated between side blades of the base and adjacent walls of the frame.

The present invention is particularly adventageous in that no adhesive or ultra-sonic welding is required to seal and encapsulate the filter in the housing. When assembled, the outer ends of the filter are crimp sealed between interlocking projections on the sides of the base and frame. Additionally, side blades along the front and back of the base cooperate with the front wall and back wall of the frame to seal and encapsulate the outboard flaps of the end pleats of the filter.

Crimp sealing the filter in the present invention results in a number of advantages. First, the available filter area is maximized because adhesives which can accumulate on and between the filter pleats are eliminated. Second, maximum filter capacity is maintained for the life of the filter because the filter housing prevents distortion of the initial pleat alignment.

Another advantage of the present invention is that flaking or chafing of the fibers from the filter media is reduced. The reduction of flaking or chafing of fibers results from encapsulating the outboard flaps of the end pleats of the filter media between the side blades of the base and the front and back walls of the frame.

In the prefered embodiment, the base includes a cross wall located midway between the sides of the base. The cross wall includes a plurality of recesses which accommodate individual filter pleats. The recesses of the cross wall are aligned with the interlocking projections of the base and frame and provide support for the filter element within the housing. The cross wall also maintains the separation of the pleats thus enhancing the retention of maximum filter capacity.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals indicate corresponding parts throughout the several views:

FIG. 1 is a perspective view of a prior art filter assembly;

FIG. 3 is a perspective view of a preferred embodiment of the present invention with a partial side break away;

FIG. 4 is a bottom perspective view of the preferred embodiment;

FIG. 5 is an exploded perspective view of the components of the preferred embodiment of the present invention;

FIG. 6 is a cross-sectional view of the present invention along the line 6—6 in FIG. 3;

FIG. 7 is a cross-sectional view of the present invention along the line 7—7 in FIG. 3.

DETAILED DESCRIPTION OF A PREFERRED EMBODIMENT

Figure 2:
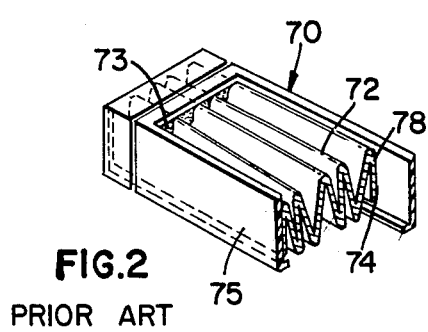
FIG. 2 is a cutaway perspective view of a prior art filter assembly.

Referring now to the drawings, there is shown in FIGS. 3-5 a preferred embodiment of the present invention generally referred to by the reference numeral 10. As is illustrated, the preferred embodiment of the present invention has three components; a generally rectangular shaped base 20, a generally rectangular shaped frame 40 and a filter element 60. When assembled, the base 20 and frame 40 crimp seal and encapsulate the filter media 60. It will be appreciated that although the preferred embodiment includes generally rectangular-shaped components, the components of the assembly could have any generally four-sided shape, including a parallelogram.

The base 20 of the present invention 10 has a generally rectangular shape and includes a front 22 a back 24 and a pair of sides 23. Each side 23 includes a plurality of projections 30 with generally pointed outer ends 32 along the interior surface 23a of the side 23. These projections 30 extend outwardly and perpendicular to the sides 23. In the preferred embodiment, these projections 30 have downwardly diverging "V" shapes. Side blades 26 having interior 26a and exterior 26b surfaces are located along the entire length of the interior surfaces 22a, 22b of the front 22 and back 24 of the base 20. The exterior surfaces 20b of the side blades 26 have inwardly beveled portions 28 near the outer edges 29 of the blades 26.

The filter media 60 which is sealed and encapsulated between the base 20 and the frame 40 includes two sets of edges 62, 64 and is accordion-folded to create a plurality of pleats 66 which are laterally aligned with one of the sets of edges 64. The folding of the filter media 60 results in the ends pleats 67 having outboard end flaps 68 at each of the edges 64. The other set of edges 62 form the outer ends of the filter 60. It will be appreciated that accordion folding the filter media 60 to create a plurality of pleats 66 results in maximizing the available filtering surface.

The frame 40 is generally rectangular in shape and has a front wall 42, a back wall 44 and a pair of side walls 43. Each wall has an interior surface 42a, 43a and 44a and an exterior surface 42b, 43b and 44b.

In the preferred embodiment, each side wall 43 includes a plurality of projections 50 having generally pointed outer ends 52 extending outwardly along and adjacent to the interior surfaces 43a of each side wall 43. In the preferred embodiment, the projections 50 have upwardly diverging "V" shapes.

An inwardly directed flange 45 is located adjacent to and perpendicular to the interior surfaces 42a and 44a of the front wall 42 and back wall 44. The flange 45 is contiguous with the projections 50 along the end of the projections 50 opposite the generally pointed ends 52.

When the invention 10 is assembled, the frame 40 overlaps the base 20 and interlockingly cooperates with the base to crimp seal and encapsulate the filter 60. More specifically, the side walls 43 overlap the sides 23 of the base 20 and the projects 50 of the frame interlockingly cooperate with the projections 30 of the base 20. The pleats 66 of the filter 60 are aligned with the projections 30 so that the outer ends 62 are crimp sealed between the interlocking projections 30, 50. Additionally, the outer ends 62 are encapsulated by the interior surfaces 23a of its base 20 and the interior surfaces 43a of the side walls 43.

FIG. 6 is a cross-sectional view along line 6—6 in FIG. 3 which illustrates the crimp seal and encapsulated outer ends 62 of filter 60. In FIG. 6 the interlocking relationship between the projections 30, 50 in the assembled unit 10 is shown.

When the base 20 and frame 40 are assembled the front wall 42 and the back wall 44 of the frame 40 overlap the side blades 26 of the base 20, thereby, crimp sealing the ends pleats 67 and encapsulating the outboard flaps 68 between the exterior surfaces 26b of the side blades 26 and the interior surfaces 42a, 44a of the front wall 42 and back wall 44.

In the preferred embodiment 10 the end pleats 67 are crimp sealed between the outer edges 29 of the side blades 26 and an inwardly directed flange 45 along and adjacent to the interior surfaces 42a and 44a of the front wall 42, and the back wall 44. The flange 45 is contiguous with the non-pointed end of the projections 50 adjacent to and along the interior surface 43a of the side walls 43. The outboard end flaps 68 are encapsulated between the interior surfaces of the front wall 42a and back wall 42b and the exterior surfaces 26b of the side blades 26.

Figure 8:
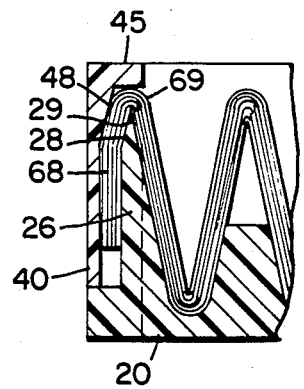
FIG. 8 is an enlarged partial end view with break away side walls.

Crimp sealing and encapsulation of the end pleats 67 is illustrated in FIG. 8. In FIG. 8 the compression point 69 of the crimp seal squeezing the filter media occurs between the flanges 45 and the outer edges 29 of the side blades 26. It will be appreciated in the preferred embodiment that inwardly beveled portions 28 of the interior surfaces of the front wall 42a and back wall 44a are aligned with the inwardly beveled portions 28 near the outer edges 29 of the exterior surfaces 26b of the side blades 26. The beveled surfaces 28,48 assert additional sealing pressure on the outboard flaps 68 without squeezing the outboard flaps between the encapsulating surfaces 42a, 44a and 26b, this eliminates deformation of the assembled unit 10.

In the preferred embodiment, a cross wall 34 with a plurality of recesses 36 is located midway between the sides 23 of the base 20. FIG. 7 is a cross-sectional view along the line 7—7 in FIG. 3 which shows how the recesses 36 of the cross wall 34 accommodate the pleats 66 of the filter 60 in the assembled unit. The cross wall member 34 provides support to the filter media 60. Additionally, the cross wall 34 maintains the spacing between adjacent pleats 66. Maintaining the spacing of the pleats 66 assures that maximum filtering capacity is retained throughout the life of the filter unit 10. It will be appreciated that its cross wall member could be associated with the frame rather than the base and that multiple cross walls may be utilized.

FIGS. 1 and 2 illustrate a prior art small disk drive filter assembly 70. Current methods of assembly such as adhesives or ultra-sonic welding do not necessarily incapsulate the exposed cut edge of its filter material leaving the filter media prone to chafing and flaking. The clear advantages of the crimp seal and encapsulation features of the present invention 10 can be clearly seen when compared to the prior art shown. FIG. 1 shows how commonly used sealing techniques relying on adhesives can result in adhesive 73 being deposited on and between the pleats of the filter 72 thereby causing a loss of valuable filtering surface.

Additionally, when the outboard end flaps 78 are secured to the housing 75 by an ultra-sonic weld 74 as seen in FIG. 7, chafing or flaking of fibers from the filter 72 at the point of the weld 74 can occur. In contrast to this, encapsulation of the outboard end flaps 68 between the exterior surfaces 26b of the side blades 26 and the interior surfaces 42a and 44a of the front wall 42 and back wall 44 of the frame 40 isolates the outboard flaps 68 from the filtering environment, thereby, minimizing flaking or chafing of media fibers within the disk drive unit.

FIG. 1 further illustrates the potential loss of filtering capacity from distortion of adjacent pleats within the assembly. As discussed previously, this problem is eliminated in the present invention by the uniform pleat spacing established and maintained by the interlocking projections 30, 50 and cross wall 34.

In the preferred embodiment the base 20 and frame 40 are injection molded from thermo-plastic and can be ultra-sonically welded together. Alternatively, the base 20 and frame 40 can be constructed from materials that can be snap locking or adhesively bonded.

The present invention securely crimp seals and encapsulates a pleated filter in a manner which provides maximum filtering capacity and long term reliability. The potential of flaking or chafing of fibers from the exposed cut edges of the filter media which may damage the disk drive unit have been minimized. Also, loss of filter capacity from excessive adhesive and distortion of initial pleat spacing have been eliminated. The present invention provides a simple and effective solution to the problems which occur with filters presently used in small disk drive units.

It must be understood, however, that even though numerous advantages and characteristics of the invention have been set forth in the foregoing description, together with details of the structure and function of the invention, the disclosure is illustrative only, and changes may be made in detail, especially in matters of shape, size and materials of the components within the principle of the invention, to the full extent indicated by the broad general meaning of the terms in which the amended claims are expressed.

What is claimed is:

1. A crimp seal pleated filter assembly comprising:
   (a) a base having a generally four-sided shape, said base including a front and a back and a pair of sides, said front, back and sides having interior and exterior surfaces, said sides including a plurality of projections adjacent to and inset from said interior surfaces of said sides and a pair of side wall blades adjacent to and inset from said interior surfaces of said front and said back, each of said projections extending outwardly and perpendicular to said sides and having an inner-end and a generally pointed outer-end, said side wall blades having an interior surface and an exterior surface and generally pointed outer edges, said side wall blades extending outwardly and perpendicular to said front and said back along the entire length of said interior surfaces of said front and said back;
   (b) filter media having two sets of edges and a plurality of pleats, said pleats being laterally aligned with one set of edges and including end pleats having outboard ends flaps at said edges, said other set of edges forming outer ends of said pleats; and
   (c) a frame having a generally four-sided shape, and having a front wall and a back wall and a pair of side walls each having interior and exterior surfaces, said side walls having a plurality of projections, extending outwardly along and adjacent to the interior surfaces of said side walls, said projections having inner ends and generally pointed outer ends, said front wall and said back wall having inwardly directed flanges adjacent to and perpendicular to said interior surfaces of said front and back walls, said flanges being contiguous with said inner ends of said projections of said side walls, said side walls interlockingly cooperating with said projections of said base to crimp seal said outer ends of said pleats between said projections of said base and said projections of said side walls, said interior surfaces of said side walls and said base encapsulating said outer ends, said interior surfaces of said front wall and back wall overlapping said side blades to crimp seal said end pleats between said outer edges of said side blades and said flanges, thereby encapsulating said outboard flaps between said exterior surfaces of said side blades and said interior surfaces of said front and back walls.

2. A crimp seal pleated filter assembly in accordance with claim 1 wherein said base includes a cross wall joining said interior surfaces of said side wall blades at a point generally mid-way between said side walls of said base, said cross wall having a plurality of recesses formed therein to space apart and support said pleats.

3. A crimp seal pleated filter assembly in accordance with claim 1 wherein said exterior surfaces of said side wall blades are inwardly beveled proximate the outer edges of said blades and said interior surfaces of said front wall and said back wall of said frame are correspondingly beveled crimp sealing said end pleats between said outer edges of said blades and said flanges; whereby distortion of said assembly is eliminated.

4. A crimp seal pleated filter assembly in accordance with claim 3 wherein said base and said frame are injection molded from thermo-plastic.

5. A crimp seal pleated filter assembly in accordance with claim 4 wherein said base and said frame are ultrasonically welded together.

6. A crimp seal pleated filter assembly in accordance with claim 4 wherein said base and said frame are snap-locking.

7. A crimp seal pleated filter housing for hard disk drive, comprising:
   (a) a filter media, said filter media having two sets of edges and a plurality of pleats, said pleats being laterally aligned with one set of edges and including end pleats having outboard end flaps at said set of edges, said other set of edges forming outer ends of said pleats;
   (b) a base having a generally rectangular shape, said base including a front and a back and a pair of sides and a cross wall, said front, back and sides having interior and exterior surfaces, said sides including a plurality of downwardly diverging "V" shaped projections adjacent to and inset from said interior surfaces of said sides and a pair of side wall blades adjacent to and inset from said interior surfaces of said front and said back, said projections having inner and outer ends and extending outwardly and perpendicular to said sides, said side wall blades having an interior surface, an exterior surface and generally pointed outer edges, said exterior surface being inwardly beveled proximate the outer edges, said side wall blades extending outwardly and perpendicular to said front and said back along the entire length of said interior surfaces of said front and said back, said cross wall joining said interior surfaces of said side wall blades at a point mid-way between said side walls of said base, and having a plurality of recesses formed therein to divide and support said pleats;

(c) a frame having a generally rectangular shape, said frame having a front wall and a back wall and a pair of side walls, said front wall and said back wall and said pair of side walls having interior and exterior surfaces, said side walls having a plurality of upwardly diverging "V" shaped projections extending outwardly along and adjacent to the interior surfaces of said side walls, said front and back walls having inwardly directed flanges adjacent to and perpendicular to said interior surfaces of said front and back walls, said flanges contiguous with said inner ends of said projections of said side walls, said side walls interlockingly cooperating with said projections of said base to crimp seal said outer ends of said pleats between said projections of said base and said projections of said side walls, said interior surfaces of said side walls and said sides encapsulating said outer pleats, said interior surfaces of said front and back walls correspondingly beveled with said exterior surfaces of said side wall blades and overlapping said side wall blades to crimp seal said end pleats between said outer edge of said side blades and said flanges and encapsulate said outboard flaps between said exterior surfaces of said side wall blades and said interior surfaces of said front wall and back wall thereby minimizing distortion of said assembly.

* * * * *